S. L. GATES.
Horse Hay Fork.
No. 39,641.
2 Sheets—Sheet 1.
Patented Aug. 25, 1863.
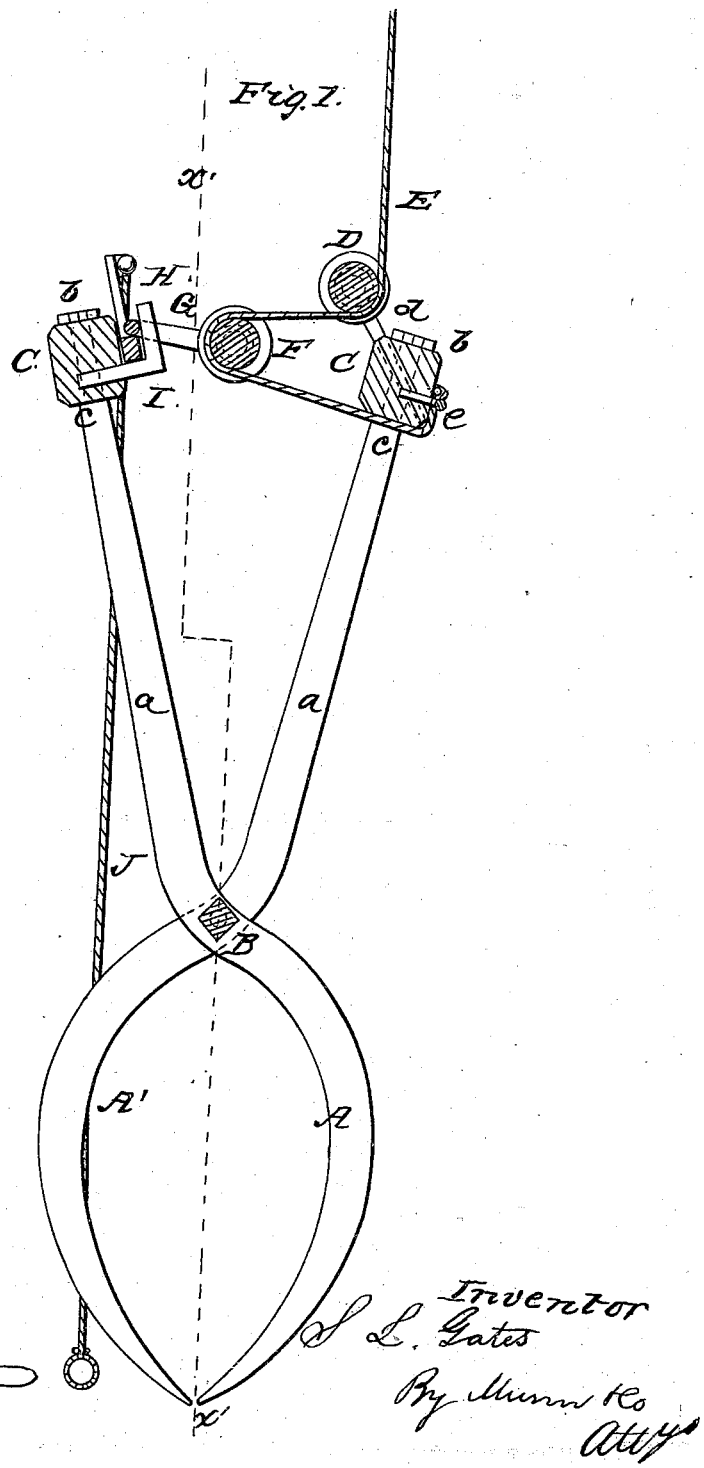

S. L. GATES.
Horse Hay Fork.
No. 39,641.
2 Sheets—Sheet 2.
Patented Aug. 25, 1863.
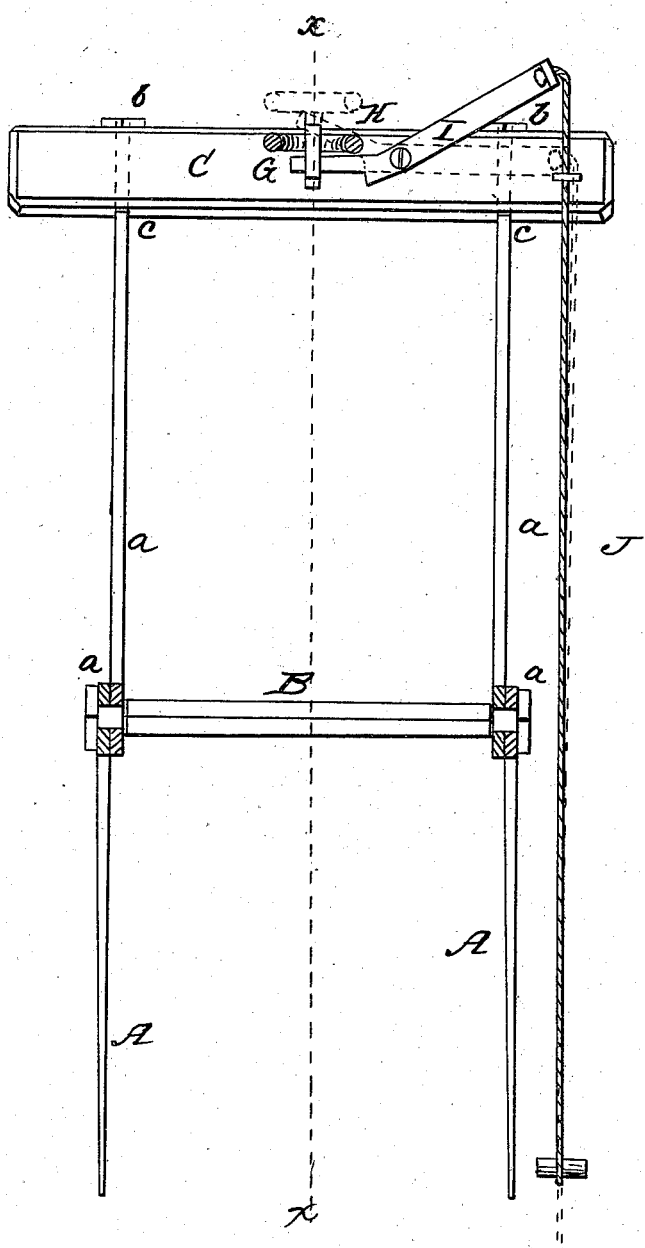

UNITED STATES PATENT OFFICE.

SILAS L. GATES, OF VERONA, NEW YORK.

IMPROVEMENT IN HORSE HAY-FORKS.

Specification forming part of Letters Patent No. 39,641, dated August 25, 1863.

*To all whom it may concern:*

Be it known that I, SILAS L. GATES, of Verona, in the county of Oneida and State of New York, have invented a new and Improved Horse-Pitchfork; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a vertical section of the same, taken in the line $x\ x$, Fig. 1.

Similar letters of reference indicate corresponding parts in the two figures.

This invention relates to a new and improved horse-pitchfork, such as are used for elevating, by means of a horse or other draft-animal, hay and grain into mows.

The invention consists in the employment or use of two pairs of hooks provided with arms, those of each pair crossing each other and fitted on a rod, the ends of the arms of each pair of hooks being connected by a cross-bar, and the latter having a rope attached to or connected with them in such a manner that when the loaded fork is raised by means of the rope aforesaid the hooks will be made to grasp and firmly hold its load, and the hooks, by a simple contrivance, readily released at any time to discharge the load.

To enable those skilled in the art to fully understand and construct my invention, I will proceed to describe it.

A A A′ A′ represent two pairs of hooks, which are provided with arms $a$, the arms of one pair crossing those of the other, and fitted on the ends of a rod, B, on which they are allowed to work freely, so that the two pairs of hooks may be moved toward and from each other. The ends of the arms $a$ of each pair of hooks are connected by a wooden cross-bar, C, the arms passing through said bars and having screw-nuts $v$ on their ends, the under sides of the bars C resting or bearing on shoulders $c$ on the arms, as shown in Fig. 1.

To the cross-bar C of one pair of arms $a$ there is attached, by a staple, $d$, a roller, D, around which a rope, E, which is attached to the same bar C, as shown at $e$, passes. This rope E also passes around another roller, F, which is fitted in a loose or detached staple, G, and this staple G, when the hooks are loaded, is fitted on a hook, H, at the inner side of the bar C of the other pair of arms $a$. To this last-named bar C there is attached a lever, I, the inner end of which is within the hook H, and on which the staple G rests when the hooks A A A′ A′ are loaded, a rope, J, being attached to the outer end of said lever, as shown clearly in Fig. 2.

The operation is as follows: The hooks are loaded by thrusting them into the hay or grain in a distended state, the staple G being detached from the hook H, and the rope E, which passes over a pulley in the upper part of the barn and down underneath a pulley at the lower part or flooring of the barn, has the horse or other draft-animal attached to its lower end. When the hooks are thus loaded the staple G is placed on the hook H and over the inner end of the lever I, and the animal is then started and the rope E elevates the hooks and its load, and at the same time has a tendency, under the pull of the animal, to press the two pairs of hooks toward each other, so that the latter will firmly hold their load, and when the latter is elevated to the desired point the operator pulls the rope J, and thereby causes the inner end of lever I to throw the staple G off from hook H, thereby releasing the hooks and causing the load to be discharged.

Thus by this simple arrangement a very economical and efficient horse-pitchfork is obtained, and one that may be manipulated with the greatest facility.

Having thus described my invention, what I claim as new, and desire to secure by Letters Patent, is—

The two pairs of hooks A A A′ A′, fitted on the rod B, as shown, in combination with the fixed roller D, loose or detachable roller F, rope E, hook H, and lever I, all arranged and combined to form a new and improved horse-pitchfork, substantially as set forth.

SILAS L. GATES.

Witnesses:
S. WM. GATES,
GEO. H. DYETT.